Patented Nov. 18, 1930

1,781,982

UNITED STATES PATENT OFFICE

MYRTIL KAHN, OF COLOGNE, WILHELM SCHEPSS, OF LEVERKUSEN-ON-THE-RHINE, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

AROMATIC METHYLENEAMINO COMPOUNDS AND PROCESS OF PREPARING THE SAME

No Drawing. Application filed June 23, 1927, Serial No. 201,017, and in Germany August 19, 1926.

The present invention concerns the manufacture of benzyl condensation products of the aromatic series by the interaction of a halogenmethyl derivative of an hydroxy-compound of the aromatic series with an aromatic amine at ordinary temperature.

It is known from U. S. Letters Patent 675,544 and British specification No. 265,203 that, when formaldehyde and hydrochloric acid act on hydroxy-carboxylic acids chloromethyl derivatives of the same are produced, which on heating further react with primary, secondary and tertiary amines with the formation of asymmetric diphenyl-methane derivatives.

In accordance with this invention aromatic amines and their derivatives also enter into reaction with halogenmethyl compounds of the aromatic series in quite a different manner, viz., the halogenmethyl compounds attach themselves to the nitrogen atom, when the reaction is carried out at room temperature, whereas at higher temperatures, as for example at the temperature of the water bath, they enter into the nucleus as already stated. The present invention therefore, only concerns the first case, whereby compounds of the general type

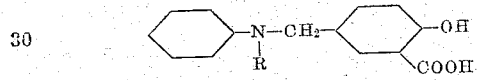

are obtained, i. e., benzyl derivatives of the aromatic amines, in which R signifies hydrogen or an alkyl or aryl residue, when primary and secondary bases are used. In the case where tertiary amines, such as pyridine, are employed, quaternary ammonium salts result.

The new products are generally whitish powders being soluble in dilute alkalies. They form azo dyes with diazocompounds and have most probably the following general formula:

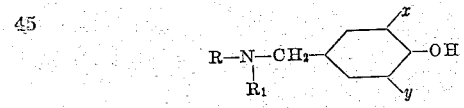

R stands for a benzene or naphthalene radicle, R₁ stands for hydrogen or a substituent e. g. alkyl or aryl. *x* means hydrogen or a substituent and *y* hydrogen or the carboxylic group.

*Example 1.*—18 parts by weight of salicylic acid are converted in the known manner into p-chloromethyl-salicylic acid, by means of formaldehyde and hydrochloric acid which is filtered and washed with ice water. Thereupon 16 parts by weight of m-sulphanilic acid are dissolved in cold sodium carbonate solution and the chloromethylsalicylic acid obtained above is introduced at room temperature into this solution, which is maintained weakly alkaline with sodium carbonate. After 24 hours the whole is acidified with hydrochloric acid and the precipitated product filtered, washed and dried. It forms a white powder, which is easily soluble in alkalies and cannot be diazotized. The product has the formula:—

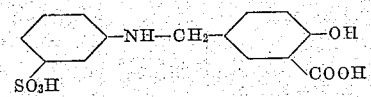

*Example 2.*—18 parts by weight of o-cresotinic acid are transformed as described above into the chloromethyl-o-cresotinic acid and this is stirred in solution weakly alkaline with sodium carbonate with 24 parts by weight of 2.8-aminonaphthol-6-sulphonic acid at room temperature. After a few hours the solution ceases to take up nitrite. By acidification with hydrochloric acid the condensation product

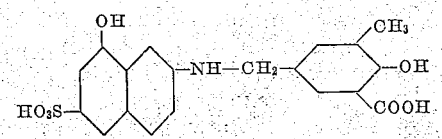

is precipitated, it is filtered, washed and dried. The new acid is a yellowish crystalline powder, insoluble in acids, but easily soluble in alkalies and couples with diazo compounds with the production of dyestuffs.

*Example 3.*—300 parts by weight of monomethylaniline are suspended in 2000 parts of water whilst vigorously stirring and efficiently cooling. The chloromethyl derivative obtained according to the customary process from 135 parts by weight of o-cresotinic acid is then stirred in. After continuing the stirring for some two hours at room temperature, sodium carbonate is added until weak alkaline reaction prevails, the whole being thus dissolved. After further stirring for several hours, the excess of the base is removed by steam distillation, when the remaining residue is precipitated with acetic acid. The new product is filtered, washed and dried and has the following constitution:

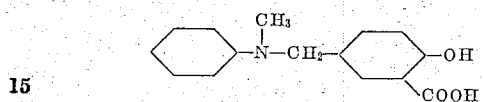

*Example 4.*—The crude paste of chloromethylcresotinic acid, obtained from 150 parts by weight of cresotinic acid is washed with a little ice water and thus freed from the bulk of the adhering hydrochloric acid. It is then introduced at 0–10° C. into 500 parts by weight of pyridine whilst stirring. Soon after the whole amount has been added, solution occurs. After several hours stirring, some of the reaction product separates from the solution, when hydrochloric acid is introduced until Congo acid reaction becomes noticeable. A thick magma of needles is thus produced, which is filtered and recrystallized from water. In this manner beautiful, long needles of the pyridine compound are obtained, which melt at 204–206° C. The new compound is soluble in alkali carbonates with development of carbonic acid, a colourless solution resulting, from which after short standing a compound separates, presumably the betain like anhydride. The pyridine compound and the betain form a yellow solution with caustic soda lye, which decomposes on heating with decolouration and splitting off of pyridine.

We claim:

1. The process for the manufacture of condensation products of the aromatic series comprising the interaction of a halogenmethyl derivative of an hydroxycompound of the aromatic series with an aromatic amine at ordinary temperature.

2. The new products being condensation products of the aromatic series, being whitish powders soluble in dilute alkalies producing azo dyes with diazocompounds and having most probably the following general formula:

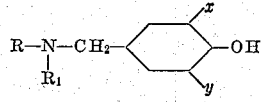

R stands for a benzene or naphthalene nucleus which may contain further substituents, $R_1$ stands for hydrogen, alkyl or aryl. $x$ means hydrogen or a substitutent and $y$ hydrogen or the carboxylic group.

3. The new condensation product obtainable from chloromethyl-ortho-cresotinic acid and 2-amino-8-naphthol-6-sulfonic acid having most probably the formula:

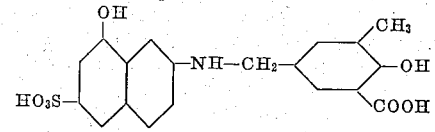

and being a yellowish crystalline powder insoluble in acids but easily soluble in alkalines and coupling with diazocompounds with the production of dyestuffs.

4. The new products being condensation products of the aromatic series, being whitish powders soluble in dilute alkalies producing azo dyes with diazocompounds and having most probably the following general formula:

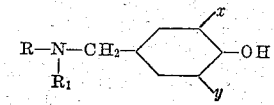

wherein R stands for a benzene or naphthalene radical containing at least one of the groups —OH and —SO$_3$H, $R_1$ stands for hydrogen, alkyl or aryl, $x$ means hydrogen or a substituent and $y$ hydrogen or the carboxylic group.

In testimony whereof we have hereunto set our hands.

MYRTIL KAHN.
WILHELM SCHEPSS.
LUDWIG ZEH.